June 15, 1926.
C. A. RANCIER
1,588,907
ANIMAL TRAP
Filed Oct. 17, 1924
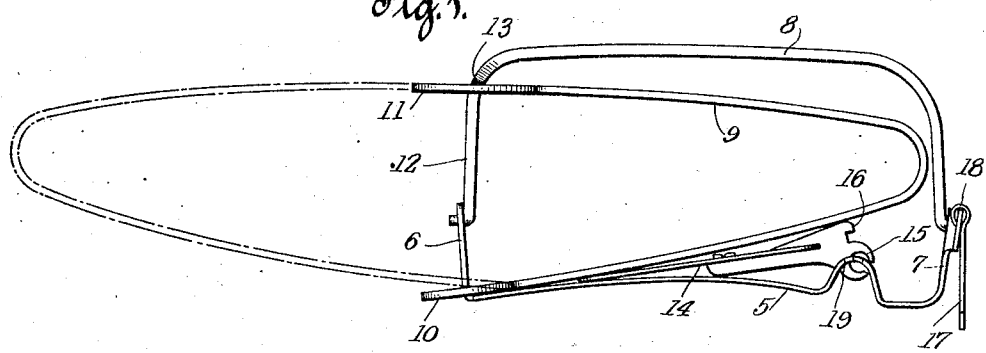
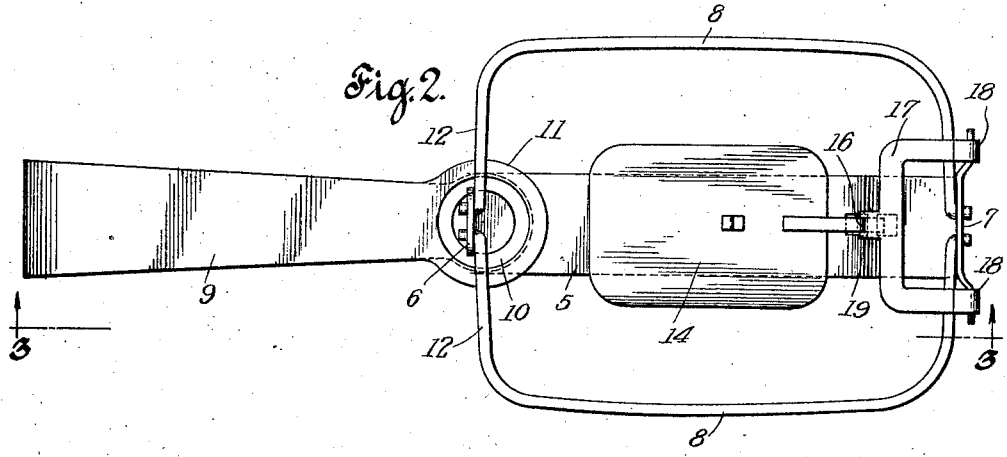
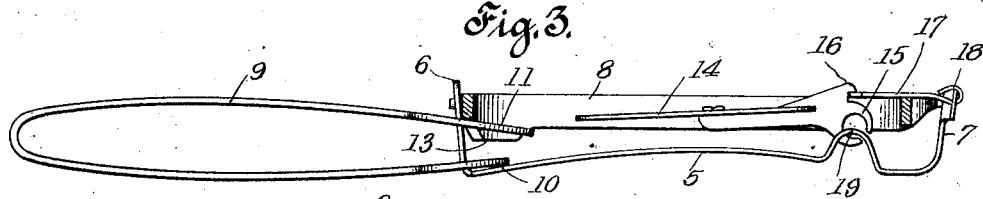
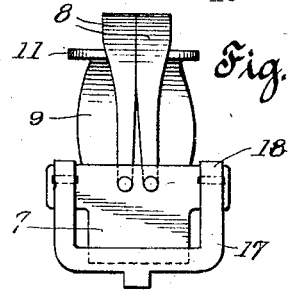
INVENTOR
Charles A. Rancier.
BY
ATTORNEY Patented June 15, 1926.

1,588,907

UNITED STATES PATENT OFFICE.

CHARLES AGUSTUS RANCIER, OF BROOKLYN, NEW YORK, ASSIGNOR OF ONE-HALF TO WILLIAM J. BOEHMER.

ANIMAL TRAP.

Application filed October 17, 1924. Serial No. 744,102.

My invention relates particularly to what are termed hinged or pivoted jaw traps.

The main object is to provide a simple, compact but powerful construction.

A special object is to provide a construction which is adapted to be folded into small space.

In carrying out the invention I provide a base member having uprights on its opposite ends to which are hinged the jaws. The bait plate or pan is hinged to the base member near one end and the latch is hinged to the adjacent upright and adapted to engage the pan to hold the pan in its elevated position with the jaws spread out. The throwing spring is hinged to the opposite end of the base member and the adjacent part of the jaws and the parts are so constructed that the spring can be folded inside the base and jaw combination.

Fig. 1 is a side view of a trap embodying my invention, the parts being folded in their compact relation for the purpose of convenience in packing and carrying. This figure also shows in dot and dash lines the position of the spring when in its normal operating position.

Fig. 2 is a plan view of the trap set.

Fig. 3 is a vertical sectional view on the plane of the line 3—3 of Fig. 2.

Fig. 4 is an end view of the trap viewed from the right, the trap being in the closed position.

The base member 5 is provided with uprights 6 and 7 at its opposite ends to which are hinged the jaw members 8.

The spring 9 is of the usual U-shaped bow type provided with perforated ends or eyes 10 and 11 which encircle respectively the upright 6 of the base and the ends 12 of the jaws. The jaws are provided with shoulders 13 with which the upper arm of the spring 9 co-acts for the purpose of closing the jaws. The lower arm of the spring presses against the base adjacent the uprights 6.

The pan 14 of any suitable construction is pivoted to the base 15 near the upright 7 and provided with a catch shoulder 16 just above the pivot. The latch 17 is hinged at 18 to extensions on the upper part of the upright 7 and is adapted to overlie the ends of the jaws 8 and engage the catch shoulder 16 on the pan 14. I prefer to arch the base at 19 where the pan is pivoted to it in order to bring the pan into such a position that it will operate satisfactorily and also permit the spring to be folded inside as shown in Fig. 1. It should be noted that the base 5 is so arched between the arched portion 19 and the upright 6 that the pan 14 when in its Fig. 1 position is substantially in the same plane as the left hand portion of the base, thus causing the spring to ride over the pan when folded inside the jaws.

It will be seen that the construction is small and compact and yet it is of such a nature that it may be provided with a powerful spring and be quite as effective as ordinary traps which are not susceptible of being folded compactly.

I claim:

1. A trap comprising a base having uprights and being arched upwardly near one upright, jaws pivoted to said uprights, an arched spring having at one end an eye to embrace said upright adjacent the arched portion of the base and at the other end an eye to embrace the upright when the trap is set and the adjacent ends of the jaws when the trap is sprung, and means for setting the trap including a bait pan pivoted to said base near the end opposite the spring and having its free end, when the trap is sprung, lying in substantially the same inclined plane as the end of the base adjacent the spring so that the spring when folded in over the adjacent end of the base will ride over the bait pan.

2. A trap comprising a base having uprights at its ends, jaws pivoted to said uprights, an arched spring having at one end an eye to embrace one of said uprights and at its other end an eye to embrace such upright when the trap is set and the adjacent ends of the jaws when the trap is sprung, and means for setting the trap including a bait pan pivoted to said base near the end opposite the spring and having its free end resting on said base when the trap is sprung, said base being so shaped at the end where the spring is pivoted that the spring when folded in over the adjacent end of the base will ride over the bait pan.

3. A trap comprising a base having uprights at its ends and adjacent one of said uprights a portion of its upper surface inclined upwardly toward the other upright, jaws pivoted to said uprights, an arched spring having at one end an eye to embrace the upright adjacent such inclined portion and at its other end an eye to embrace such upright when the trap is set and the adjacent ends of the jaws when the trap is sprung, and means for setting the trap including a bait pan pivoted to said base near the end opposite the spring and having its free end resting on the base when the trap is sprung so that the spring when folded within the jaws will be guided over the bait pan by said inclined portion of the upper surface of the base.

CHARLES AGUSTUS RANCIER.